United States Patent
Schier et al.

(10) Patent No.: US 10,142,976 B2
(45) Date of Patent: Nov. 27, 2018

(54) USER EQUIPMENT GROUPING AND COMMON CONTROL SIGNALING TO USER EQUIPMENT GROUPS

(71) Applicants: ZTE WISTRON TELECOM AB, Kista (SE); ZTE (TX) INC., Austin, TX (US)

(72) Inventors: Thorsten Schier, Kista (SE); Patrick Svedman, Kista (SE); Aijun Cao, Kista (SE); Yonghong Gao, Kista (SE); Jan Johansson, Kista (SE); Bojidar Hadjiski, Kista (SE)

(73) Assignee: ZTE TX INC., Plano, TX (US)

( * ) Notice: Subject to any disclaimer, the term of this patent is extended or adjusted under 35 U.S.C. 154(b) by 33 days.

(21) Appl. No.: 14/775,605

(22) PCT Filed: Mar. 13, 2014

(86) PCT No.: PCT/US2014/026304
§ 371 (c)(1),
(2) Date: Sep. 11, 2015

(87) PCT Pub. No.: WO2014/151717
PCT Pub. Date: Sep. 25, 2014

(65) Prior Publication Data
US 2016/0135146 A1    May 12, 2016

Related U.S. Application Data

(60) Provisional application No. 61/794,008, filed on Mar. 15, 2013.

(51) Int. Cl.
*H04W 72/04* (2009.01)
*H04W 72/12* (2009.01)
(Continued)

(52) U.S. Cl.
CPC ........... *H04W 72/042* (2013.01); *H04W 4/08* (2013.01); *H04W 72/005* (2013.01);
(Continued)

(58) Field of Classification Search
None
See application file for complete search history.

(56) References Cited

U.S. PATENT DOCUMENTS

| 8,347,174 B2 | 1/2013 | Chun et al. |
| 2008/0037496 A1 | 2/2008 | Smith et al. |

(Continued)

FOREIGN PATENT DOCUMENTS

| CN | 1805594 A | 7/2006 |
| CN | 102905356 A | 1/2013 |

(Continued)

OTHER PUBLICATIONS

International Search Report and Written Opinion of the International Searching Authority in international application No. PCT/US2014/026304, dated Jul. 24, 2014, in 13 pages.

*Primary Examiner* — Chi H Pham
*Assistant Examiner* — Raul Rivas
(74) *Attorney, Agent, or Firm* — Duane Morris LLP

(57) ABSTRACT

A cellular telecommunications system and method of scheduling a group of user equipments is provided. The system includes a macro cell with a macro base station and multiple associated low power nodes (LPN's). The macro base station and the LPN's share the same cell ID. The system and method provide for scheduling a group of UE's by grouping a plurality of the UE's together, assigning a group identifier to the group, notifying the group and encoding a control channel with the group identifier. A single control channel is delivered to each UE in the group of UE's. The UE's of the group of UE's may be processed by different LPN's. The transmitted control channel may be included in a DCI (downlink control information) and delivers uplink scheduling grants to the UE's. Based on the transmitted control channel, the UE's are scheduled for uplink transmission.

26 Claims, 4 Drawing Sheets

(51) Int. Cl.
*H04W 4/08* (2009.01)
*H04W 72/00* (2009.01)

(52) U.S. Cl.
CPC ........... *H04W 72/121* (2013.01); *Y02D 70/00* (2018.01); *Y02D 70/1262* (2018.01)

(56) References Cited

U.S. PATENT DOCUMENTS

| | | | |
|---|---|---|---|
| 2013/0029669 A1 | 1/2013 | Boudreau et al. | |
| 2013/0343241 A1* | 12/2013 | Niu | H04B 15/00 370/280 |

FOREIGN PATENT DOCUMENTS

| | | |
|---|---|---|
| JP | 2008-244559 | 10/2008 |
| JP | 2013-520084 | 5/2013 |
| JP | 2014-518033 | 7/2014 |
| WO | WO 2008/084985 | 7/2008 |
| WO | WO 2011/056023 | 5/2011 |
| WO | WO 2011/100326 | 8/2011 |
| WO | WO 2011/130436 | 10/2011 |
| WO | WO 2012/149674 | 11/2012 |
| WO | WO 2013/021531 | 2/2013 |

\* cited by examiner

USER EQUIPMENT GROUPING AND COMMON CONTROL SIGNALING TO USER EQUIPMENT GROUPS

TECHNICAL FIELD

This invention is generally related to cellular telecommunication systems, and in some applications, to a heterogeneous network where multiple low-power nodes are deployed in a macro base station's coverage.

BACKGROUND

Cellular communication systems are capable of providing not only voice services, but also mobile broadband services. As the number of applications supported by cell phones continues to increase resulting in greater amounts of data consumption, the need for mobile broadband data services also increases. This requires telecommunication operators to improve data throughput wherever possible.

As the spectrum efficiency for the point-to-point link already approaches its theoretical limit, one way to increase data throughput is to split big cells into smaller and smaller cells. When cells become closer to each other, however, adjacent cell interferences become more severe, and the cell splitting gain saturates. Furthermore, today it is becoming increasingly difficult to acquire new sites to install base stations for the operators and the associated costs are also increasing. Therefore, cell-splitting cannot fulfil all of the demands necessary to provide the demand for increased broadband services.

Recently a new type of network deployment, so-called HetNet (Heterogenous Network), has been proposed and is attracting a lot of interest and effort in the industry. In HetNet, another tier consisting of multiple Low-Power Nodes (LPN's) is added onto an existing macro base station's coverage. In some examples of this deployment, the macro base station works as a master and the Low Power Nodes (LPN) work as slaves in order to have better interference management and resource allocation, etc. In other deployments, however, the LPN's work as equals with the macro base station, i.e. the LPN's are not subservient to the macro base station.

One deployment choice for example in a Long Term Evolution (LTE) network, is a deployment in which the underlying Low Power Nodes do not have their own cell ID (identification). Instead, the Low Power Nodes all share the same cell ID with the Macro station in this deployment.

In LTE networks, the position of the cell specific reference signal (CRS) is deduced from the cell ID. The CRS is transmitted from the Macro node. The LPN's may or may not transmit the CRS. These and other conventional deployments suffer from several disadvantages or problems as discussed in further detail below.

In general, the LTE network sends control channels to the user equipment (UE) communicating via the network. The control channel is sent from a central point. A control channel carries no user data. Instead, the control channel is used to configure the communication with the UE. The UE then decodes a number of control channels. A UE determines if a decoded control channel is dedicated to it, if a cyclic redundancy check (CRC), or similar code, matches one of a set of UE identity numbers such as an RNTI (Radio Network Temporary Identifier) or other identifier.

This control channel mechanism can be used for many purposes, including delivering uplink scheduling grants to a UE.

These control channels can be either Unicast or Broadcast. In Unicast control channels, the UE identity number is unique. A UE may have multiple unique UE identity numbers. The use of a particular identity number could be used to indicate a certain type of scheduling, for example dynamic or semi-persistent scheduling (SPS). In Broadcast control channels, all UE's in a cell share a UE identity number, i.e., all the UE's in a cell have the same UE identity number. This is done to deliver system information to all UE's. In LTE networks, for example, all UE's within a cell share the same system information radio network temporary identifier (SI-RNTI).

One problem that can arise during an LTE uplink transmission is described below. However, the same or similar problem also exists for LTE downlink transmissions, or even uplink or downlink transmissions in accordance with other networks and other communication standards.

With the introduction of HetNets, the available radio resources can be reused several times by sharing them among the LPN's. FIG. 1 shows an example of a cell that includes macro base station 1 and LPN's 5. The illustrated example is an example in which macro base station 1 and LPN's 5 share the same cell ID. In the illustrated example, three LPN's 5 are deployed under the same macro cell 7 and in the illustrated example, each LPN 5 is associated with a user equipment, UE 9. Each LPN 5, i.e. LPN1, LPN2 and LPN3, has an associated LPN uplink coverage region 17 and the associated LPN uplink coverage regions 17 are separated from each other within macro cell 7. One UE 9 is illustrated in each of the LPN coverage regions 17 in FIG. 1 but multiple UE's are typically associated with each LPN coverage region 17. Uplink PUSCH (physical uplink shared control channel) transmissions 13 of the UE's 9 can be carried out with low power since they only need to reach the closest LPN 5 and not macro base station 1. As such, the uplink PUSCH transmissions 13 of an LPN coverage region 17 therefore do not interfere with other UE transmissions such as other UE transmissions from other UE's 9 to other LPN's 5 in other LPN coverage regions 17. Hence, the uplink transmissions can be carried out on the same physical resources and more UE's can be served simultaneously when compared to only the macro cell covering that area. By the "same physical resources," it is meant that the same physical resource blocks (PRB's) can be used by several UE's; for uplink transmission. If the UE's are located so that their uplinks are not interfering with each other, then the UE's can transmit using the same PRB's. This technique is oftentimes referred to as space division multiple access (SDMA) or area splitting.

When more UE's 9 are served simultaneously, more control signaling is needed to schedule the transmissions of these UE's. For example, the uplink scheduling information in LTE systems is transmitted to the UE's with Downlink Control Information (DCI). In LTE, the DCI signals 19 are sent either on the physical downlink control channel (PDCCH) (from 3GPP Release 8 and onwards, for example) or on the enhanced PDCCH (ePDCCH) (from 3GPP release 11, for example). The available resources for PDCCH/ePDCCH resources are limited and have not been extended in the recent 3GPP releases. This becomes a major bottleneck when multiple UE's need to be served simultaneously. The scheduler, which is typically implemented in the macro cell 7, decides which UE's 9 are scheduled on the physical resources and which modulation coding scheme (MCS) each UE 9 has to use. This information is then sent as a downlink control information (DCI) signal 19 to the corresponding UE 9. The DCI signals 19 includes a UL grant, e.g. UL grant 1

(DCI), as indicated in FIG. 1. The UL grant identifies which PRB's (physical resource blocks) should be used by the associated UE for uplink transmission.

One example of a problem that can arise in networks such as networks described above, is as follows.

A DCI such as DCI signal 19 consists of one or several control channel elements (CCE's). Depending on the length of the DCI and the radio link quality, 1, 2, 4 or 8 CCE's are used to form one DCI in some examples. The number of total available CCE's is limited and depending on the system bandwidth and the number of OFDM symbols that are used for PDCCH in the sub-frame. In many examples, there are 1-3 OFDM symbols per sub-frame. OFDM (orthogonal frequency-division multiplexing) is a method of encoding digital data on multiple carrier frequencies and OFDM symbols can represent or convey one or several bits of data.

In some examples, such as when a system's bandwidth is 10 MHz, 9, 26 or 42 CCE's may be available depending on if 1, 2 or 3 OFDM symbols are used for the PDCCH space. The number of OFDM symbols may be limited for the PDCCH since they take away resources for data transmission. For example, if 4 CCE's are needed to form one DCI, and only 26 CCE's are available, then only 6 DCI's can be sent during one sub-frame. Additionally, there are separate DCI's for power control, DL (downlink) and UL (uplink) scheduling. The control channel mechanism delivers uplink (UL) scheduling grants to a UE via DCI signal 19. Thus, under these conditions, only 2-3 UE's can be scheduled for uplink transmission during one sub-frame and it would be desirable to schedule more UE's for uplink transmission.

The present disclosure addresses such shortcomings.

SUMMARY

According to one aspect, provided is a method of scheduling a group of UE's. The method comprises grouping a plurality of UE's together thereby forming a UE group; assigning a group identifier to the UE group; notifying the UE group of the group identifier; encoding a control channel with the group identifier; and transmitting the control channel with the group identifier to the UE group.

According to another aspect, provided is a non-transitory, tangible computer readable storage medium encoded with computer program code, wherein, when the computer program code is executed by a processor, the processor performs a method for scheduling a group of UE's in a telecommunication system. The method comprises: grouping a plurality of UE's together thereby forming a UE group; assigning a group identifier to the UE group; notifying the UE group of the group identifier; encoding a control channel with the group identifier; and transmitting the control channel with the group identifier to the UE group.

According to another aspect, provided is a telecommunications system comprising: a macro base station and a plurality of LPN's (low power nodes) associated with said macro base station; a group of UE's; a group identifier associated with the group of UE's; a control channel encoded with the group identifier; and at least one of the macro base station and the plurality of LPN's configured to transmit the control channel with the group identifier, to the group of UE's.

BRIEF DESCRIPTION OF THE DRAWING

The present disclosure is best understood from the following detailed description when read in conjunction with the accompanying drawing. It is emphasized that, according to common practice, the various features of the drawing are not necessarily to scale. On the contrary, the dimensions of the various features may be arbitrarily expanded or reduced for clarity. Like numerals denote like features throughout the specification and drawing.

DETAILED DESCRIPTION

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the specific examples and embodiments described and shown herein.

The present disclosure provides a system and method for user equipment UE grouping and common control channel signaling to UE groups. The grouping enables a single control channel to be delivered to a group of UE's, limiting the number of separate transmissions required and allowing for scheduling multiple UE's for uplink (UL) transmission during one sub-frame. The present disclosure also provides a tangible, non-transitory computer readable storage medium that includes instructions such that, when a computer or processor executes the instructions, the computer or processor carries out the method of the disclosure as described herein.

The present disclosure is directed to various telecommunication systems operating at various bandwidths such as but not limited to 10 MHz. Other bandwidths are used in other embodiments. Various numbers of OFDM symbols may be used. The present disclosure is directed to various UE's (user equipment) such as cellular telephones and other mobile devices associated with various cellular telecommunication systems.

In some embodiments, the UE's are grouped into subsets. In various embodiments, a UE identification ("id") identity number or UE sub-set identification, is assigned to each UE in a sub-set of the UE's. Hence, a single common control channel can be transmitted to each UE in this sub-set, i.e. group, of UE's. The control channel includes a group identifier such as a G-RNTI (Group Radio Network Temporary Identifier). The transmission of the control channel includes delivering uplink scheduling grants to the UE's. In some embodiments, the control information of the control channel which carries no user data, is transmitted to the UE's via multi-cast transmission(s). Additionally, in various other embodiments, UE's belonging to certain groups are dynamically re-arranged, i.e. re-grouped, for new multicasts. In various embodiments, the scheduling transmissions of the UE's are based on the transmission of the control channel.

Figure 1:
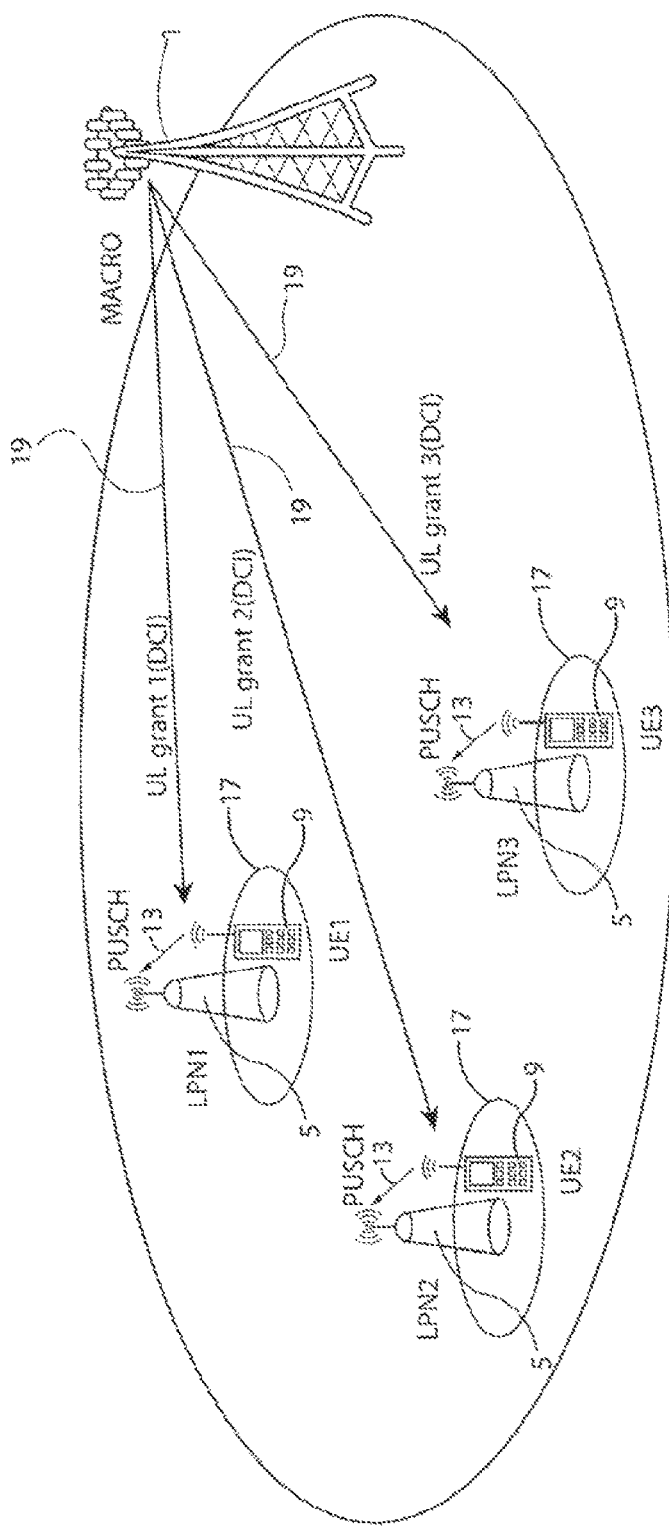
FIG. 1 shows a conventional cellular telecommunication system according to the PRIOR ART.
Figure 2:
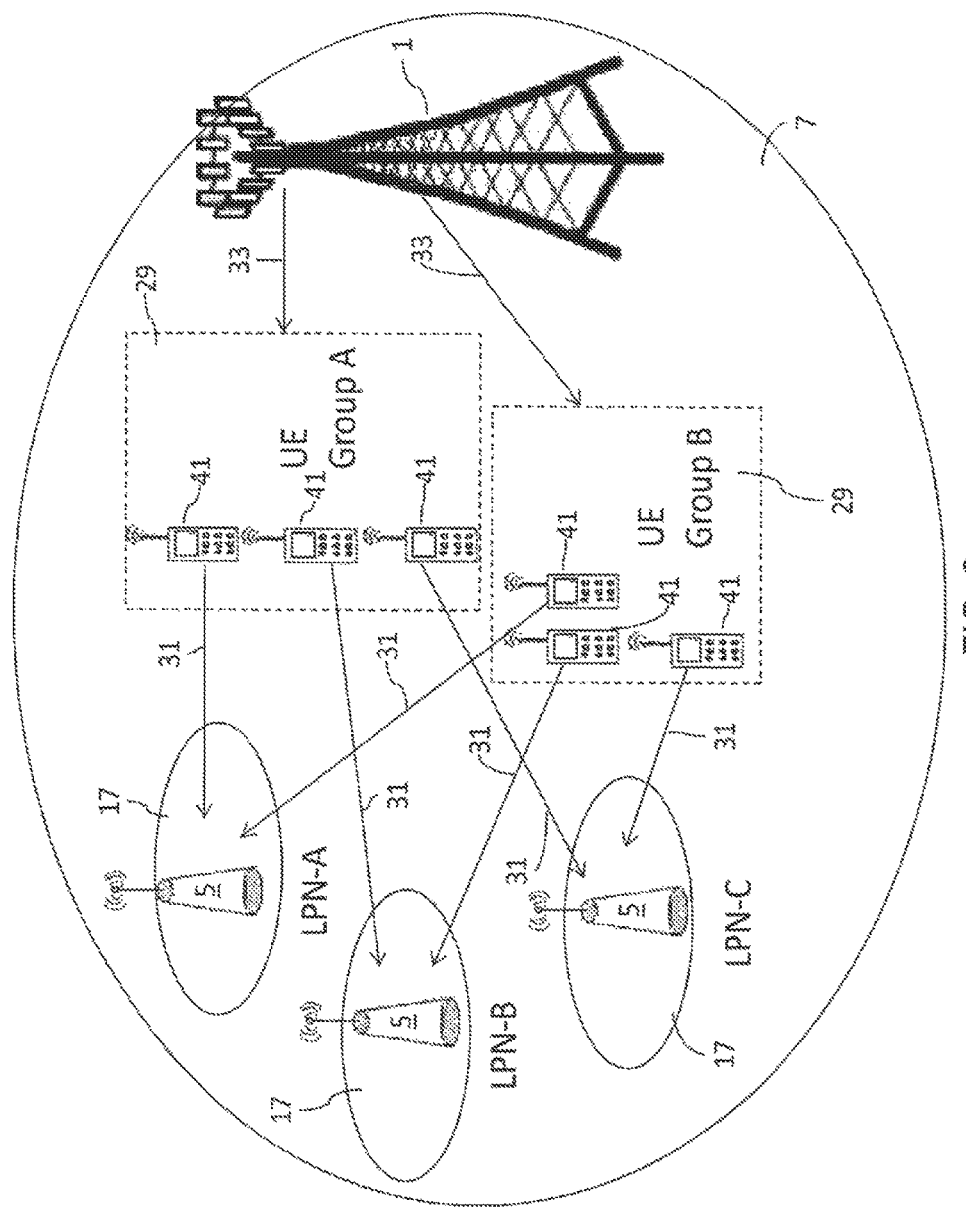
FIG. 2 shows a cellular telecommunication system of a heterogeneous network with multiple low-power nodes deployed in a macro base station's coverage and including grouped UE's, according to various embodiments of the disclosure.

In various embodiments of the disclosure, a super-cell configuration is provided as in FIG. 2. Like features are identified by like reference numbers throughout the disclosure. In the super-cell configuration provided as in FIG. 2, one macro base station 1 and several low-power nodes LPN's 5 share the same cell ID. Each LPN 5 has an associated LPN uplink coverage region 17 within macro cell 7 in the configuration of FIG. 2. In some embodiments (see FIG. 3) one or more LPN uplink coverage regions 17 overlap within macro cell 7. In FIG. 2, the UE's 41 are grouped into UE groups 29. Associated with the super-cell configuration of FIG. 2 are a plurality of UE's. Each UE group 29 includes a grouping of multiple UE's 41 of the plurality of UE's. The UE's 41 of each UE group 29 may provide uplink transmissions to multiple LPN's 5, i.e. one or more UE's 41 of a particular UE group 29 is processed by one LPN 5 while another one or more UE's 41 of the same UE group 29 is processed by another LPN 5. Although three LPN's 5 are shown in FIG. 2, in various embodiments, macro cell 7 includes various other numbers of LPN's 5. In some embodiments, the number of LPN's 5 present in macro cell 7, determines how many UE's are in a UE group because in some embodiments, each UE 41 of a UE group 29 is associated with a different node, i.e. a different LPN 5. In other embodiments, the UE group 29 includes one or more UE's 41 associated with the same LPN 5.

Figure 3:
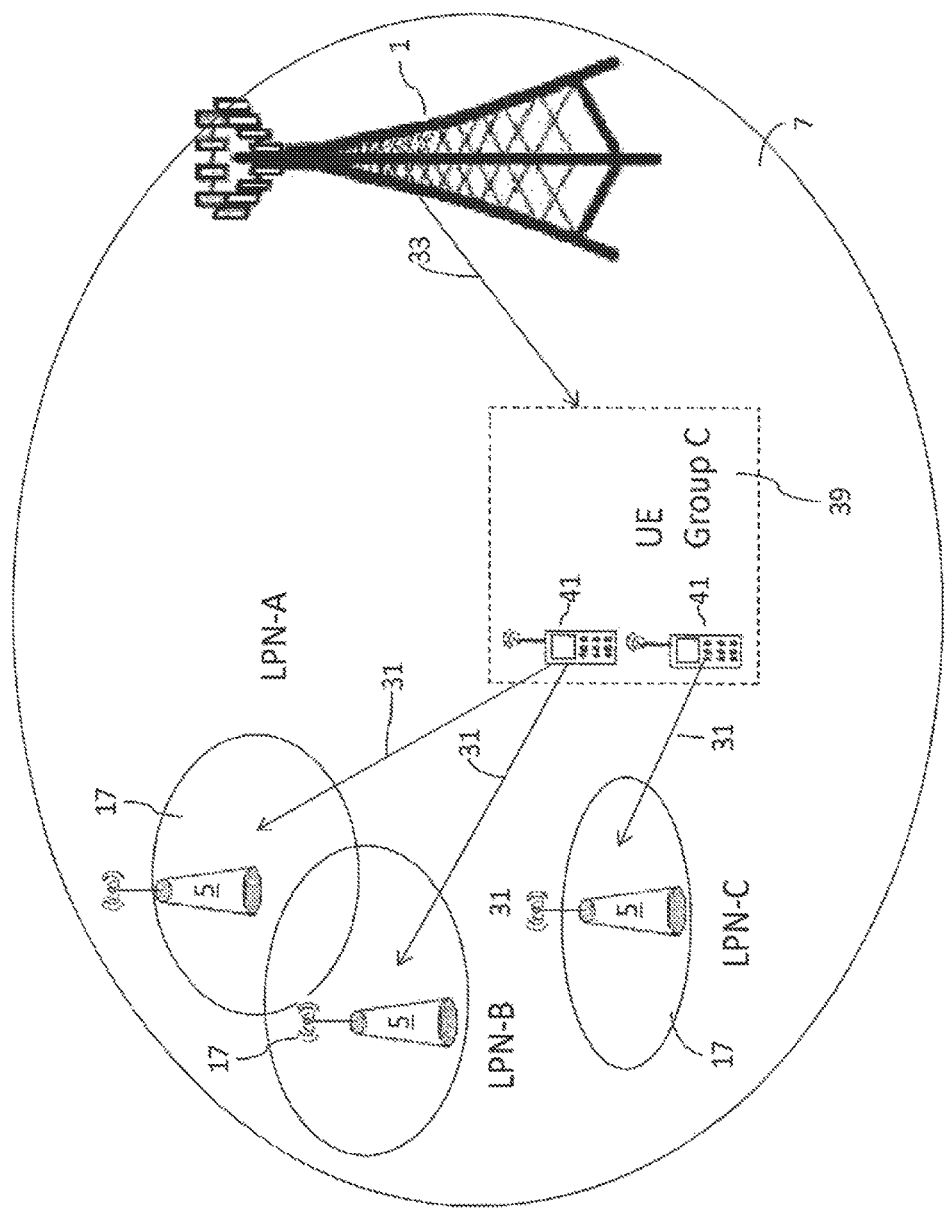
FIG. 3 shows a cellular telecommunication system of a heterogeneous network with multiple low-power nodes deployed in a macro base station's coverage and including a UE group, according to various other embodiments of the disclosure.

In some embodiments such as in FIG. 3, one or more UE's 41 of a UE group 39 is associated with more than one LPN 5. This may be the case according to embodiments in which a UE is located in an overlapping LPN uplink coverage region 17, such that the UE uplink is received by more than one node, i.e. by more than one LPN 5. In FIG. 3, two LPN uplink coverage regions 17 overlap one another and a particular UE 41 has uplink transmissions received by more than one node, i.e. more than one LPN 5. In FIG. 3, UE group 39 includes multiple UE's 41 and includes one UE 41 that includes uplink transmissions 31 to more than one LPN 5, i.e. to both LPN-A and LPN-B.

Now returning to FIG. 2, the illustrated embodiment includes two UE groups 29, each having UE's with uplink transmissions processed by each of LPN's 5, but various numbers of UE groups 29 and LPN's 5 are associated with macro cell 7, in other embodiments. Each of the LPN's 5 may be associated with multiple UE groups 29 and with different numbers of UE groups 29 in various embodiments. When a group of UE's are assigned to the same physical resources i.e. the same physical resource blocks (PRB's) such that the UE's are transmitting on the same PRB's, this group of UE's receives their resource allocation with one individual PDCCH or ePDCCH. The PRB is defined 3GPP 36.211 section 5 (rel8), the contents of which are hereby incorporated herein, by reference. In FIG. 2, each LPN 5 includes multiple UE groups 29 associated therewith. In some embodiments, each UE 41 of the UE group 29 is associated with a different LPN. Each UE group 29 has UE's 41 associated with all three illustrated LPN's 5 in FIG. 2.

Still referring to FIG. 2, common control command 33 is transmitted to each group of UE's 29 and thus sends the same control information applicable to many UE's 41 instead of notifying each UE individually as done in prior art communication protocols. Various numbers of UE's are grouped together and a common control command 33, in this embodiment a common DCI, is transmitted to this UE group 29. The common control command 33 is sent from one central point. In one embodiment, the central point is a macro node such as macro base station 1. In other embodiments, this central point is one of the LPN's 5. In this manner, several UE's 41 are served by the same central node for DL, but the uplink is processed by multiple nodes.

Uplink signal 31 is sent by the UE's 41 of UE groups 29, to the associated LPN 5 as in the illustrated embodiment or to multiple LPN's 5 in other embodiments (see FIG. 3). In this manner, each UE group 29 includes one or more UE's 41 processed by each of the LPN's 5, i.e. by each of LPN-A, LPN-B and LPN-C. Alternatively stated, in this manner, each UE group 29 includes UE's 41 processed by different LPN's 5. In some embodiments, each UE 41 of a UE group is processed by a different, associated LPN 5, i.e. no two UE's 41 of a UE group are processed by the same LPN 5 in this embodiment. The UE's 41 are grouped together to form UE group 29 to receive the same control information by common control command 33, saving downlink (DL) resources. FIG. 2 illustrates the embodiment in which one common control command 33 is sent from macro base station 1 to all UE's 41 of a UE group 29.

Because of the one common control command 33 transmitted to this group of UE's 29, various embodiments of the disclosure provide the advantage over conventional systems in which scheduling is done individually on a per UE basis such as, for example, current releases of the 3GPP (Third Generation Partnership Project) standard. The PDCCH is located in the first 1-3 OFDM symbols over the entire bandwidth. According to one advantageous aspect of the present disclosure, the UE need not search all possible locations for a PDCCH that is intended for it. In order to reduce complexity, each UE 41 searches a common space and then a dedicated area for DCI's such as common control command 33 shown in FIG. 2. In some embodiments, the common area is used to broadcast system information and the dedicated areas are used for scheduling information. In various other embodiments, the common area also contains scheduling information as such is not prohibited.

When the scheduler decides to assign certain resources to a certain UE, it encodes the common control command 33 intended for that UE with the identifier that is unique for that UE within the cell radio network temporary identifier (C-RNTI) or using another group identifier. In various embodiments, various RNTI's (radio network temporary identifiers) are used. Various types of RNTI's are used in various LTE systems. In one embodiment, an SI-RNTI (System Information radio network temporary identifier) identifier is used and shared by the UE's. In some embodiments, when a UE such as a UE 41 in UE group 29, is searching for common control command 33, it is applying its RNTI (Radio Network Temporary Identifier) to evaluate if the message was intended for it.

In contrast to the present invention, in conventional node configurations, multiple UE's are scheduled individually using valuable control channel resources (e.g., PDCCH/ePDCCH in LTE systems) even though the UE's can be assigned to the same physical resource(s). However, it is a waste of scarce control channel resources (e.g., PDCCH/ePDCCH in LTE systems) to send control information to each UE individually and the present disclosure provides the advantage of economic use of control channel resources by providing a common control channel to a group of UE's, i.e. the multiple UE's need not be individually scheduled.

Figure 4:
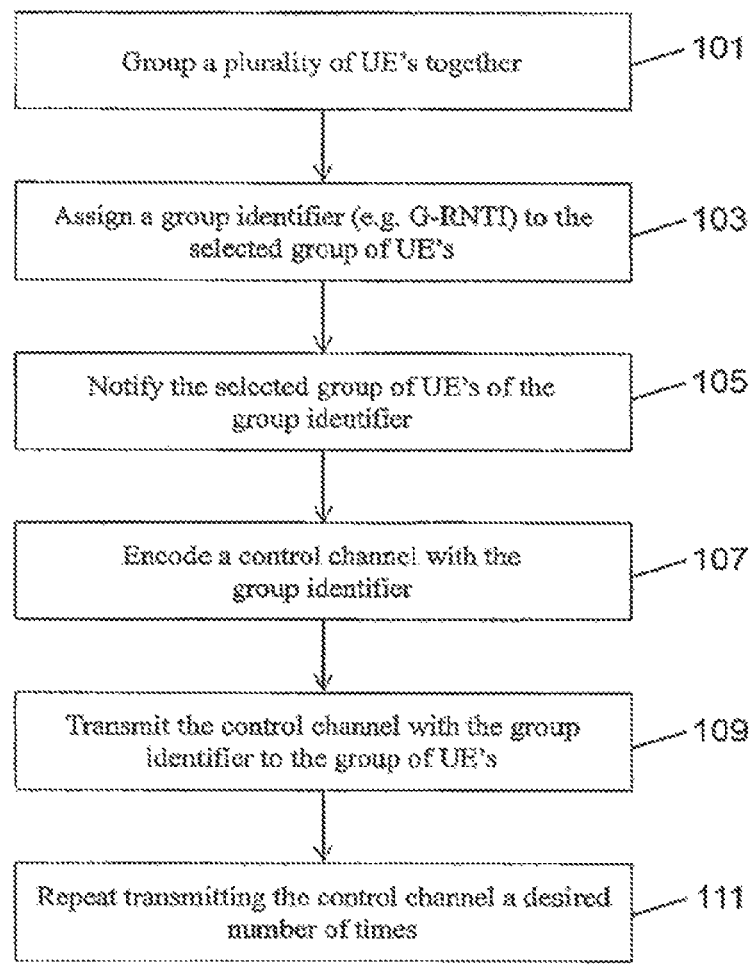
FIG. 4 is flowchart illustrating a method according to various embodiments of the disclosure.

FIG. 4 is a flowchart showing a method of scheduling a group of UE's, which provides advantages over the inefficiencies of prior systems and protocols in accordance with various embodiments of the disclosure. At step 101, a plurality of UE's are grouped together. In various embodiments, the grouped together UE's are the UE's scheduled on the same resources. The UE's that are grouped together may be selected from a multitude of UE's associated with various types of telecommunication systems. In various embodiments, this grouping can be based on location estimation of the UE's position but this grouping can be based on other factors in other embodiments. At step 103, a group identifier is assigned to the selected group of UE's. In some embodiments, the group identifier is a G-RNTI (Group Radio Network Temporary Identifier) but other group identifiers such as a cell radio network temporary identifier (C-RNTI) or other suitable group identifiers, are used in other embodiments. The central node that performs the scheduling, e.g. macro base station 1 or an LPN 5 in some embodiments, groups the UE's together. This central node has knowledge about the UE location and therefore the central node knows in which node the uplink of each UE is received. In this manner, the central node (e.g. macro base station 1) is capable of grouping the UE's together for DL transmission where the UL of the UE group is received in different nodes, e.g. different LPN's 5. At step 105, the UE's of the selected group of UE's are notified of the group identifier by the RRC, Radio Resource Control signaling.

At step 107, "Encode a control channel with the group identifier", the control channel associated with the UE group is encoded with the G-RNTI or other group identifier associated with the selected group of UE's. Various methods and various types of suitable codes and coding techniques are used in various embodiments. At step 109, the common control channel with the group identifier is transmitted to the group of UE's by the central node, i.e. common control command 33 from macro base station 1 in the illustrated embodiment, or by an LPN 5 in other embodiments. At step 109, the common control channel is simultaneously transmitted to each UE of the group of UE's. In this manner, a single control channel is delivered to multiple UE's, i.e. each UE of the group of UE's simultaneously. At step 111, the step of transmitting the control channel is repeated a desired number of times.

Thus, in accordance with one of the principles of the present disclosure, a single control channel is delivered to a group of UE's. The control channel delivers uplink scheduling grants to the UE's of the group of UE's.

In various embodiments, steps 107 and 109 are performed multiple times after steps 101, 103 and 105 have been performed once. In this manner, a control channel is received multiple times (steps 107-109) by the same group of UE's identified in steps 101-105.

In various other embodiments, each of the sequence of steps 101-109 are performed multiple times. In some embodiments, steps 101-109 are performed sequentially multiple times. In various embodiments, the selected group of UE's are changed one more times when the steps are repeated. In other embodiments, the selected group of UE's remain the same. More particularly, when steps 101-109 are performed multiple times, one or more times that step 101 is performed, i.e. repeated, the UE's are grouped differently. Each UE group may include a plurality of UE's from a large population of UE's associated with the macro cell. The differently grouped UE's can be associated with one or all of the LPN's.

The preceding description merely illustrates the principles of the disclosure. It will thus be appreciated that those of ordinary skill in the art will be able to devise various arrangements which, although not explicitly described or shown herein, embody the principles of the disclosure and are included within its spirit and scope. Furthermore, all examples and conditional language recited herein are principally intended expressly to be only for pedagogical purposes and to aid the reader in understanding the principles of the disclosure and the concepts contributed by the inventors to furthering the art, and are to be construed as being without limitation to such specifically recited examples and conditions.

While one or more embodiments of the invention have been described above, it should be understood that they have been presented by way of example only, and not by way of limitation. Likewise, the various figures or diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations.

One or more of the steps or functions described in this disclosure may be performed by an appropriately configured module. The term "module" as used herein, can refer to hardware, firmware, software executed by hardware, and/or any combination of these elements for performing the associated functions described herein. Additionally, for purpose of discussion, the various modules can be discrete modules; however, as would be apparent to one of ordinary skill in the art, two or more modules may be combined to form a single module that performs the associated functions according embodiments of the invention.

Additionally, one or more of the functions described in this document may be performed by means of computer program code that is stored in a "computer program product", "non-transitory computer-readable medium", and the like, which is used herein to generally refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), which when executed, enable the computing system to perform the desired operations.

It will be appreciated that, for clarity purposes, the above description has described various examples and embodiments of the invention with reference to different functional units and/or processors. However, it will be apparent that any suitable distribution of functionality between different functional units, processors or domains may be used without detracting from the invention. For example, functionality illustrated to be performed by separate units, processors or controllers may be performed by the same unit, processor or controller. Hence, references to specific functional units are only to be seen as references to suitable means for providing the described functionality, rather than indicative of a strict logical or physical structure or organization.

Additionally, as would be apparent to those of ordinary skill in the art, many alternative methods and techniques for implementing the disclosure can be realized without undue experimentation.

What is claimed is:

1. A method of scheduling a group of user equipment devices (UE's), comprising:
grouping a plurality of UE's together thereby forming a UE group;
assigning a group identifier to said UE group;
notifying said UE group of said group identifier;
encoding a control channel with said group identifier; and transmitting said control channel with said group identifier to said UE group, wherein said transmitting said control channel comprises transmitting a common control command to each UE of said UE group,
wherein each of said UE's of said UE group is associated with a macro cell including a plurality of low power nodes (LPN's) associated with a single macro base station, wherein at least one UE of said UE group is configured to send an uplink signal to more than one of said LPN's and said macro base station, and wherein said plurality of LPN's share a same cell identification.

2. The method as in claim 1, further comprising repeating the transmitting said control channel, a plurality of times.

3. The method as in claim 1, wherein said group identifier includes all said UE's of said UE group having the same UE identity number.

4. The method as in claim 1, wherein said group identifier comprises a Group Radio Network Temporary Identifier (G-RNTI) group identifier.

5. The method as in claim 1, wherein each UE of said UE group is processed by an associated LPN of said plurality of LPN's and no two UE's of said UE group are processed by the same one of said LPN's, and said macro base station and said plurality of LPN's share the same cell identification.

6. The method as in claim 1, wherein said transmitting comprises broadcasting, and said plurality of UE's are a plurality of UE's that are scheduled on the same resources.

7. The method as in claim 6, wherein said plurality of UE's that are scheduled on the same resources is determined based on location estimation of the UE's positions, and said transmitting said control channel comprises transmitting a common control command to each UE of said UE group.

8. The method as in claim 1, wherein said macro cell is a macro cell of an LTE system and said macro base station and said plurality of LPN's share the same cell identification.

9. The method as in claim 1, wherein said transmitting said control channel includes delivering uplink scheduling grants to said UE's and further comprising scheduling transmissions of said UE's for uplink transmission, based on said transmitting said control channel.

10. The method as in claim 1, further comprising, after said transmitting,
further grouping a further plurality of UE's together thereby forming a further UE group;
further assigning a further group identifier to the further UE group;
notifying said further UE group of said further group identifier;
encoding a further control channel with said further group identifier; and
further transmitting said further control channel with said further group identifier to said further UE group.

11. The method as in claim 10, wherein said further UE group is different from said UE group.

12. The method as in claim 10, wherein said plurality of UE's are part of a population of UE's and said further grouping comprises regrouping said population of UE's to form said further UE group.

13. A non-transitory, tangible computer readable storage medium encoded with computer program code, wherein, when the computer program code is executed by a processor, the processor performs a method for scheduling a group of user equipment devices (UE's) in a telecommunication system that includes a plurality of low power nodes (LPN's) associated with a single macro base station, said method comprising:
grouping a plurality of UE's together thereby forming a UE group;
assigning a group identifier to said UE group;
notifying said UE group of said group identifier;
encoding a control channel with said group identifier; and
transmitting said control channel with said group identifier to said UE group, wherein said transmitting said control channel comprises transmitting a common control command to each UE of said UE group,
wherein each of said UE's of said UE group is associated with a macro cell including said plurality of LPN's associated with said single macro base station, wherein at least one UE of said UE group is configured to send an uplink signal to more than one of said LPN's and said macro base station, and wherein said plurality of LPN's share a same cell identification.

14. The non-transitory, tangible computer readable storage medium as in claim 13, wherein said method further comprises repeating said transmitting said control channel, a plurality of times.

15. The non-transitory, tangible computer readable storage medium as in claim 13, wherein said group identifier being a Group Radio Network Temporary Identifier (G-RNTI) group identifier.

16. The non-transitory, tangible computer readable storage medium as in claim 13, wherein each UE of said UE group is associated with a different one of said LPN's and said macro base station and said plurality of LPN's share the same cell identification.

17. The non-transitory, tangible computer readable storage medium as in claim 16, wherein said plurality of UE's are a plurality of UE's that are scheduled on the same resources based on location estimation of the UE positions.

18. The non-transitory, tangible computer readable storage medium as in claim 13, wherein said method further comprises:
further grouping a further plurality of UE's together thereby forming a further UE group;
further assigning a further group identifier to said further UE group;
notifying said further UE group of said further group identifier;
encoding a further control channel with said further group identifier; and
further transmitting said further control channel with said further group identifier to said further UE group.

19. The non-transitory, tangible computer readable storage medium as in claim 18, wherein said method includes each of said UE's of said UE group being processed by more than one of said LPN's, said macro base station and said plurality of LPN's share the same cell identification and said further transmitting said further control channel comprises further transmitting said further control command to each UE of said UE group.

20. The non-transitory, tangible computer readable storage medium as in claim 13, wherein said method includes said transmitting said control channel including delivering uplink scheduling grants to said UE's and further comprising scheduling transmissions of said UE's for uplink transmission, based on said transmitting said control channel.

21. A method of scheduling a group of user equipment devices (UE's), comprising:
grouping a plurality of UE devices together thereby forming a UE group;
assigning a group identifier to said UE group;
notifying said UE group of said group identifier;
encoding a control channel with said group identifier; and transmitting said control channel with said group identifier to said UE group, wherein said transmitting said control channel comprises transmitting a common control command to each UE of said UE group, wherein each of said UE's of said UE group is associated with a macro cell including a plurality of low power nodes (LPN's) associated with a macro base station and each of said LPN's is configured to receive an uplink signal from said UE group and a further UE group, and wherein said plurality of LPN's share a same cell identification.

22. The method as in claim 21, wherein at least one UE of said UE group is associated with more than one LPN of said plurality of LPN's.

23. The method as in claim 21, wherein said transmitting said control channel includes delivering uplink scheduling grants to said UE's such that said plurality of UE's are scheduled on common resources.

24. The method as in claim 23, wherein said common resources comprise common physical resource blocks (PRB's).

25. The method as in claim 21, wherein said transmitting said control channel includes delivering uplink scheduling grants to said UE's and further comprising scheduling transmissions of said UE's for uplink transmission, based on said transmitting said control channel.

26. The method as in claim 21, wherein each UE of said UE group is processed by an associated LPN of said plurality of LPN's and no two UE's of said UE group are processed by the same one of said LPN's, and said macro base station and said plurality of LPN's share the same cell identification.

* * * * *